July 21, 1931.　　　　G. A. GRAB　　　　1,815,770
FORK FOR MOTOR VEHICLES
Filed Dec. 26, 1929　　2 Sheets-Sheet 1
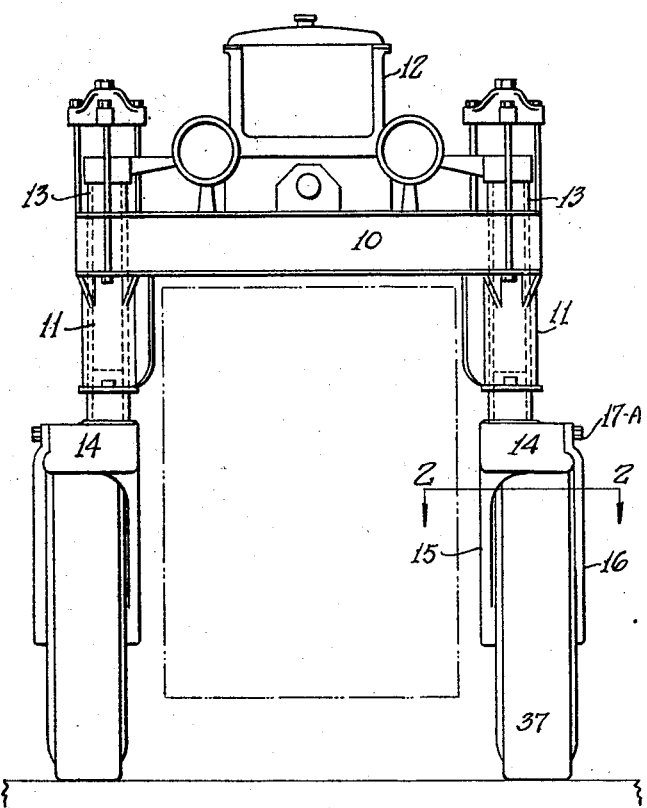
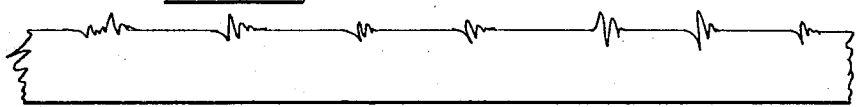
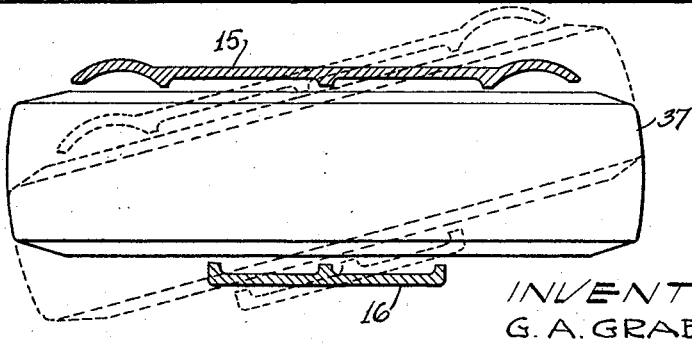
INVENTOR
G. A. GRAB
ATTORNEY

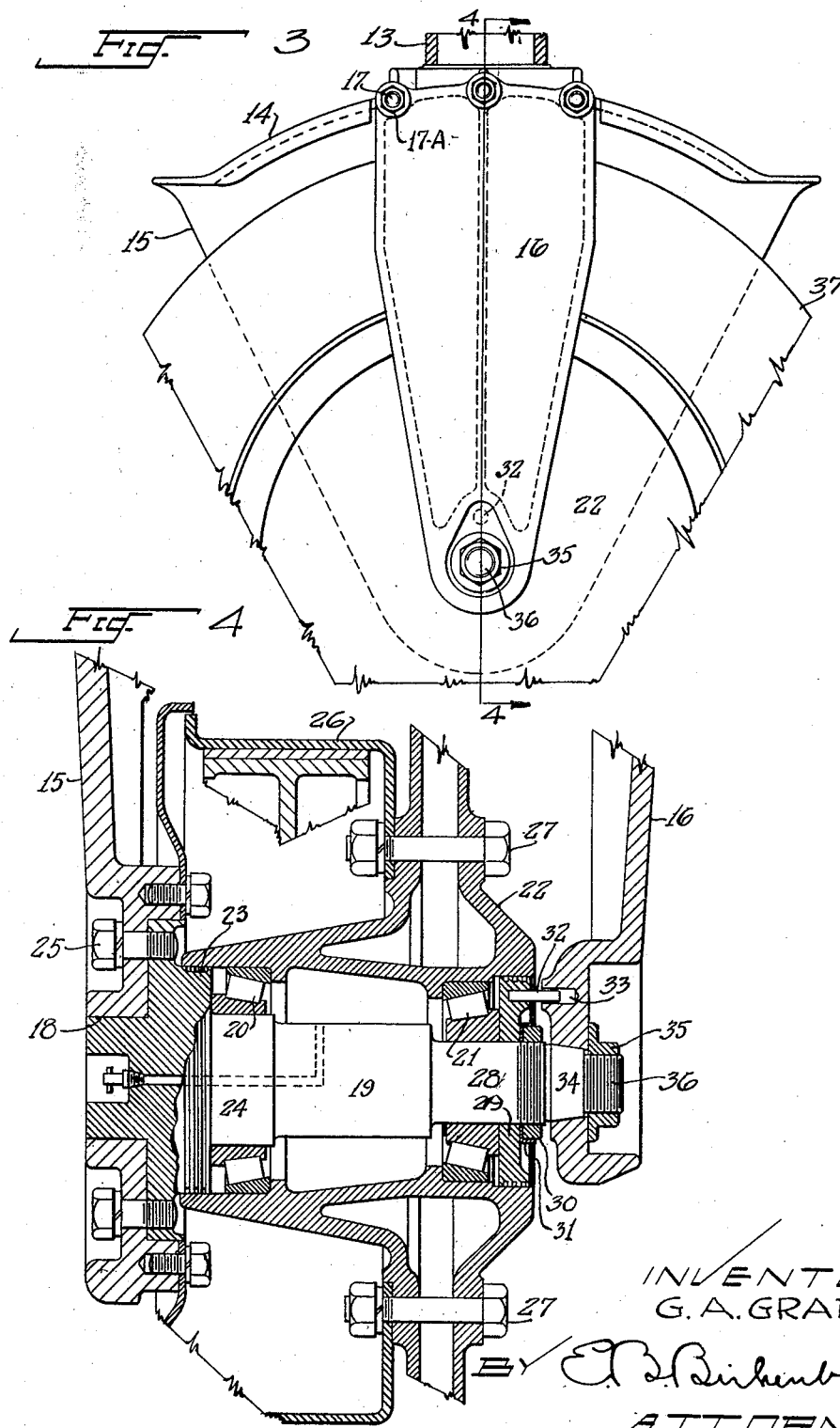

Patented July 21, 1931

1,815,770

UNITED STATES PATENT OFFICE

GUSTAV A. GRAB, OF PORTLAND, OREGON, ASSIGNOR TO WILLAMETTE-ERSTED COMPANY, OF PORTLAND, OREGON

FORK FOR MOTOR VEHICLES

Application filed December 26, 1929. Serial No. 416,400.

This invention relates generally to the automotive industry, and particularly to land traveling vehicles employing pneumatic tires.

The main object of this invention is to provide a special form of fork for that type of hoist known as lumber carriers in which a vehicle straddles a pile of lumber and picks same up bodily for transportation purposes, and in which unusually large loads are handled.

The second object is to provide a form of fork for lumber carriers employing pneumatic tires in which both ends of the axle are supported as distinguished from the ordinary motor vehicle steering wheel in which one end only is supported.

The third object is to produce a form of fork which will make it possible to reduce the width of the wheel element to a minimum and at the same time provide the maximum amount of lateral rigidity.

These, and other objects, will become more apparent from the specification following as illustrated in the accompanying drawings, in which:

Figure 1 is a front elevation of the lumber carrier.

Figure 2 is a horizontal section along the line 2—2 in Fig. 1.

Figure 3 is a fragmentary side elevation of the fork showing the supporting sleeve broken away in section.

Figure 4 is a section along the line 4—4 in Figure 3.

Similar numbers of reference refer to similar parts throughout the several views.

Referring in detail to the drawings, there is shown a lumber carrier whose cross ties 10 unite the cast corner members 11 which are explained in detail in my copending application Serial Number 181,456. The position of the engine 12 is also indicated. In each corner post 11 is mounted a vertical steering spindle 13 whose lower end terminates in a curved mud guard 14 on the inner side of which is the fork 15 which is cast integral therewith, while on the outer side of the mud guard 14 is the fork side 16 whose upper end is secured by means of the bolts 17 to the guard 14. The sides 15 and 16 are preferably ribbed and shaped, as shown in Figure 2, for the purpose of securing the maximum amount of rigidity therefrom. Obviously, modified forms of this shaping may be employed. Under certain circumstances and with very light carriers the side 16 may be dispensed with, but on the heavier machines it is a necessary element.

The fork side 15 is provided with a central opening 18 in which is secured the axle 19 on whose roller bearings 20 and 21 is mounted the wheel 22. A grease retainer 23 is formed on the axle 19 against the shoulder 24 and is secured to the fork side 15 by means of the bolts 25. The brake drum 26 is secured to the wheel 22 by means of the bolts 27. On the reduced end 28 of the axle 19 is placed the grease retainer 29 on the outside of which is placed an adjusting nut 30 which is preferably held against rotation by means of a key 31.

The grease retaining disk 29 is prevented from rotating by means of a pin 32 which is pressed into same and whose projecting end fits loosely into the hole 33 in the fork side 16. The tapered portion 34 of the axle 19 fits into a corresponding recess in the side 16 wherein it is held by means of a nut 35 on the threaded end 36 of the axle 19.

Brake and other details not directly connected with this invention have been omitted from the drawings.

It will be noted that the inner fork side 15 is almost as wide as the mud guard 14, whereas the outer fork side 16 is relatively narrow for the reason that the inner fork side must carry the brake element and must also be sufficiently strong to support the load alone, whereas the outer fork side 16 is actually a brace between the end of the axle 19 and the mud guard 14, functioning chiefly as a compression member and eliminating the bending strains from the axle 19.

It will be seen that when the bolts 25 and the nut 35 are tightened that the sides 15 and 16 and the axle 19 are united into a unitary box-like structure giving them a great deal more lateral stability and strength than would otherwise be possible.

In operation should it be desired to change a tire 37 it is only necessary to remove the nuts 17—A and the nut 35 and lift the side 16 away from the fork and wheel, after which free access is had to the wheel and tire itself.

It will be understood that carriers of this type are provided with lifting hoists which, when reversed, can be used to lift the device off from the ground. This is accomplished by placing blocks of wood under the lifting shoes and then lowering the shoes, which causes the wheels of the truck to be lifted bodily from the roadway. In other words, a lifting jack of any sort is not required for tire changing purposes. After the change has been made the side 16 is replaced and secured as before.

In some instances it may be desirable to provide a hinge connection at the top of the fork side 16 instead of a bolt connection (as shown) for the purpose of eliminating the chances for a loss of the bolts during a change of tires; although of course it would be desirable to make a hinge connection somewhat wider than is shown for the bolt connection in order to provide the same degree of rigidity.

Due to the fact that these carriers carry enormous loads which are much greater than was intended to be carried on our highways, it has become imperative that they be equipped with pneumatic tires. Owing to their peculiar construction the usual steering spindle mechanism cannot be employed and it is for the purpose of securing the required rigidity and sturdiness of construction that I have designed the fork above described.

I claim:

1. The combination of a straddle type of hoist with a forked steering spindle, a pneumatic tired wheel mounted in said fork, and means for removing one side of said fork without releasing said wheel.

2. In a lumber carrier, the combination of a fork for steering spindles having one removable side and having one fixed side and an axle rigidly attached to said fixed side having one end supported by said removable side.

3. In a lumber carrier, a fork for steering spindles having one removable side and one fixed side, and a shaft having means for rigidly securing same between the lower ends of said fork.

4. The combination of a straddle frame vehicle having forked steering spindles mounted at the corners thereof, pneumatic tired wheels mounted under said spindles, and means for supporting the inner end of each wheel axle from an inner forked side alone when the outer forked side is removed for the purpose of changing tires.

5. In a lumber carrier the combination of a straddle type frame having steering spindles at each side thereof, each steering spindle having a fork at the lower end thereof between which a wheel can be supported, means for removably holding the outer side of said forks in a rigid relation with the inner sides thereof, and axles fixed to said inner forked sides and removably supported by the outer forked sides.

6. A fork for steering spindles constituting an upright spindle member, a mud guard mounted at the bottom of said steering spindle, an inner forked arm forming a part of said mud guard, an outer forked arm removably attached to said mud guard, the lower ends of said forked arms constituting supports for a vehicle axle, and a vehicle axle permanently secured to the inner forked arm and secured to the outer forked arm by means of a tapered connection.

7. In a fork for lumber carriers the combination of a vertical spindle, a mud guard formed at the bottom of said spindle, an inner arm forming a part of said mud guard, an outer arm having its upper end attached to said mud guard, a wheel axle permanently secured to said inner arm, a brake mechanism secured to said inner arm, a wheel mounted on said axle having a drum mounted thereon, grease retainers at opposite ends of said wheel around said shaft, an adjusting nut on said shaft against the outer side of the outer grease retainer, and means for preventing the rotation of said outer grease retainer consisting of a pin extending into said outer grease retainer and into said outer arm.

GUSTAV A. GRAB.